UNITED STATES PATENT OFFICE.

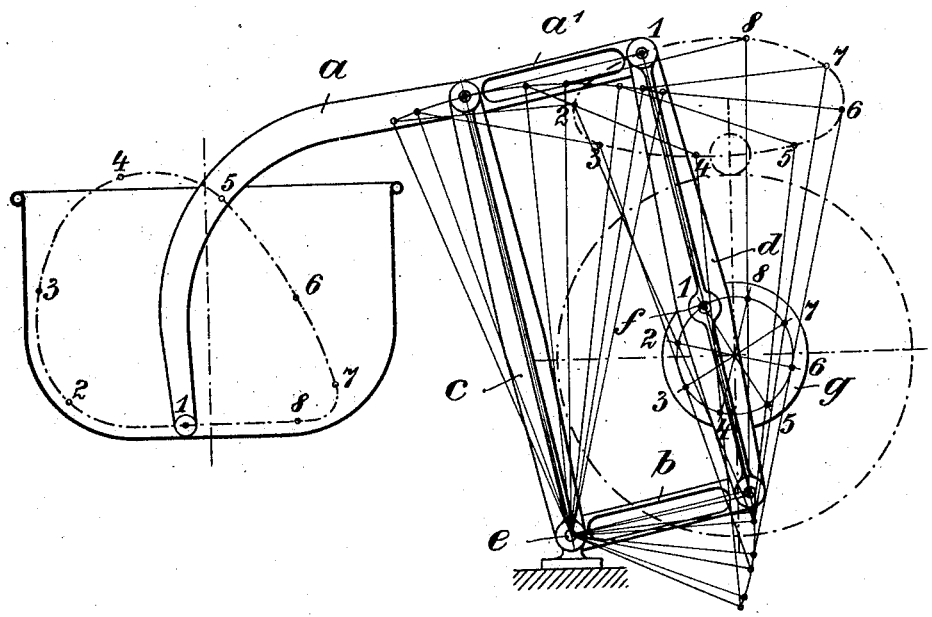

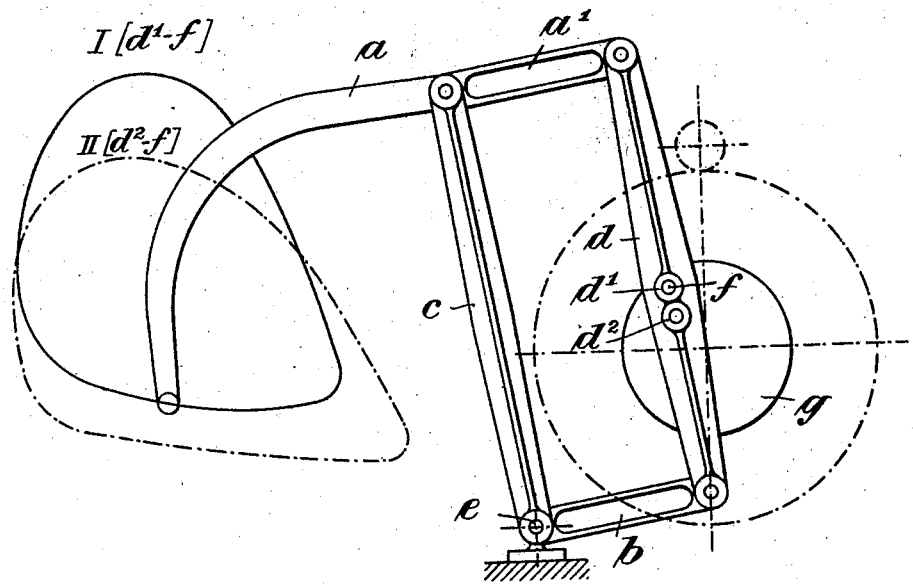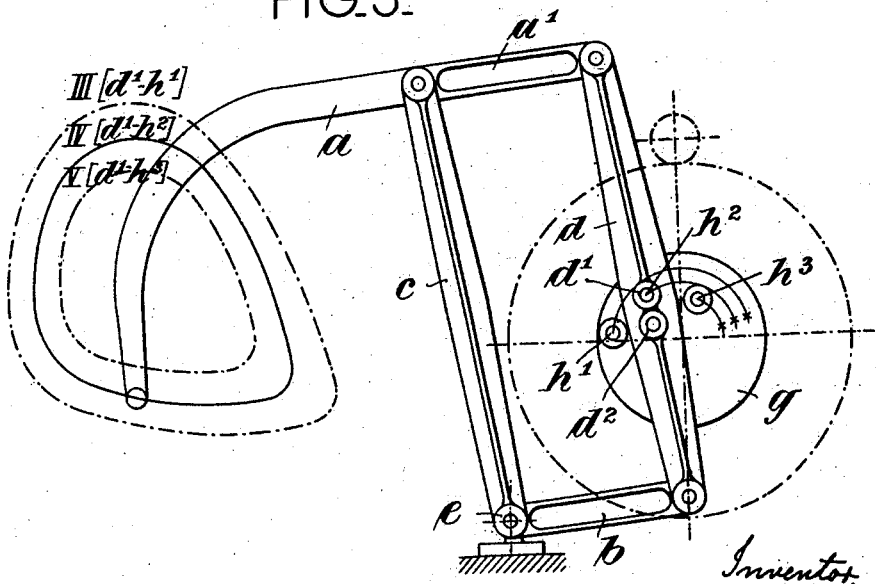

CARL LAURICK, OF BERLIN, GERMANY.

MIXING, KNEADING, AND THE LIKE MACHINE.

1,393,799.   Specification of Letters Patent.   Patented Oct. 18, 1921.

Application filed May 14, 1919. Serial No. 297,173.

*To all whom it may concern:*

Be it known that I, CARL LAURICK, a citizen of the German Empire, residing at Berlin, Germany, have invented new and useful Improvements in Mixing, Kneading, and the like Machines, (for which I have filed application in Germany on Dec. 8, 1917 and Dec. 12, 1917,) of which the following is a specification.

This invention relates to a controlling gear for the kneading arm of mixing, kneading and the like machines, in which the kneader travels in a simple closed curve.

According to the present invention the kneading or mixing arm forms part of a linked quadrilateral having one of its pivots fixed, the said arm forming an elongation of one of the bars opposite said fixed pivot and extending beyond the pivot adjoining said fixed pivot. Motion is imparted to the said arm by means of a crank having its free end pivoted to the other bar opposite said fixed pivot. The end of the kneading or mixing arm thus describes an ogival path, whereby its kneading or mixing action is rendered particularly effective. By shifting the point of pivotal connection between the crank and the bar the form of the curve described by the kneading arm can be accommodated to different requirements. In the case where the mechanism described shall be applied to straining devices, I prefer pivoting the bar connected to the crank substantially horizontally, the kneading arm thus extending substantially vertically downward so that the weight of the said arm and the gear which it is fixed to is utilized in working the material.

In the accompanying drawing a constructional form of the invention is exemplified.

Figure 1 is a side elevation of a mixing and kneading machine.

Fig. 2 is a modification of this machine, with two different kneading curves I and II, respectively, obtained by varying the point on which the crank acts.

Fig. 3 is another modification of the machine, with kneading curves III, IV and V, respectively, obtained by varying the stroke of the crank.

As shown in Figs. 1 to 3 the kneading arm $a$ is coupled at two points to the driving gear having the form of a linked quadrilateral. The kneading arm, thus forms the elongation of the upper side of the said linked quadrilateral. The upper kneading member $a^1$ and the bar $b$ form the two short sides, the bars $c$ and $d$ the long sides of the linked quadrilateral. The one lower corner of the linked quadrilateral $a$—$c$ $b$—$d$ is fitted to the pivot $e$. The driving gear is driven, and consequently the kneader is controlled by the pivot $f$ of the crank disk $g$ engaging in the bar $d$ of the linked quadrilateral.

In the constructional form shown in Fig. 2 the bar $d$ is provided with a plurality of bosses for example two, disposed, $d^1$, $d^2$ longitudinally beside each other, so that the point at which the crank disk acts on the bar $d$ may be varied. When the crank pin $f$ is fitted in the boss $a^1$, the kneader will travel along the curve I. When, on the other hand, the pin $f$ is fitted into the boss $d^2$, the kneader will describe the curve II.

In the constructional form shown in Fig. 3 the crank disk $g$ is provided with three bosses $h^1$, $h^2$, $h^3$ on different radii, so that the bar $d$ and the disk $g$ may be coupled in a simple manner by simply inserting a crank pin. The kneader curves are here produced by varying the stroke of the crank pin. Curve III corresponds to curve I, that is to say $d^1$ is coupled with $h^1$; with curve IV $d^1$ is coupled with $h^2$, and with curve V $d^1$ with $h^3$.

Figure 4:
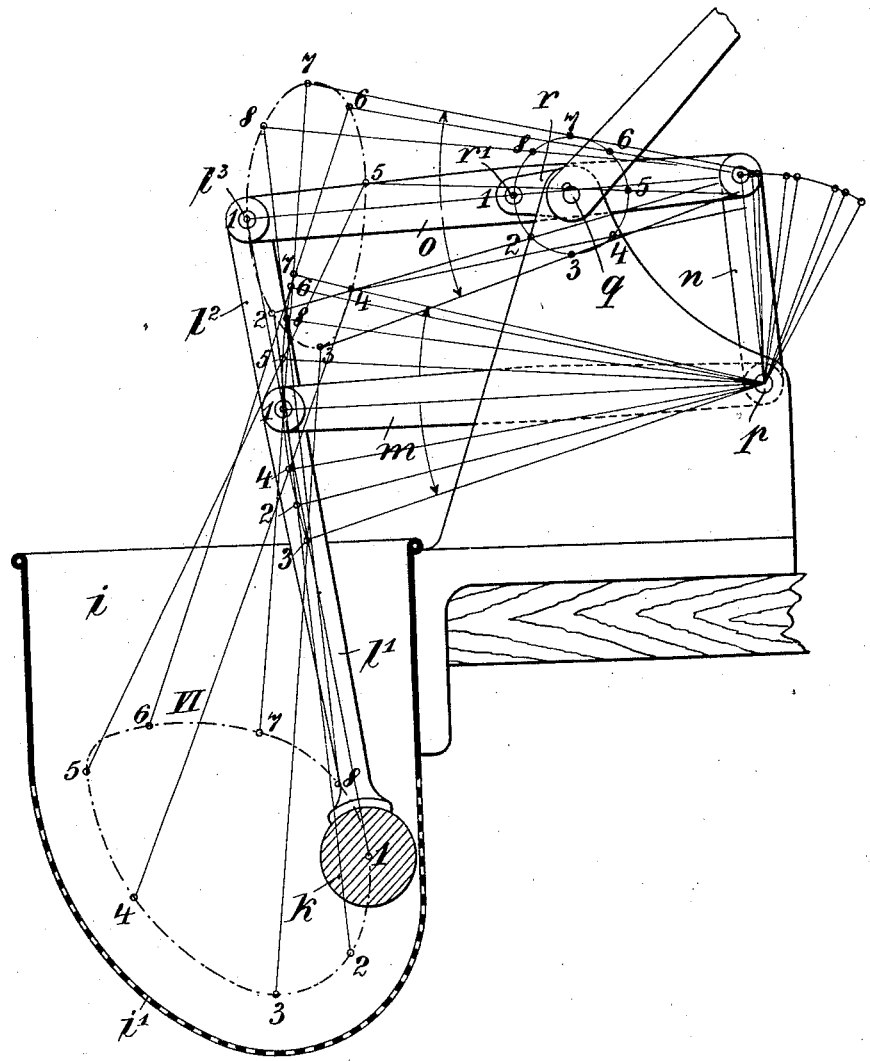
Fig. 4 is a further modification in a straining machine.
Figure 5:
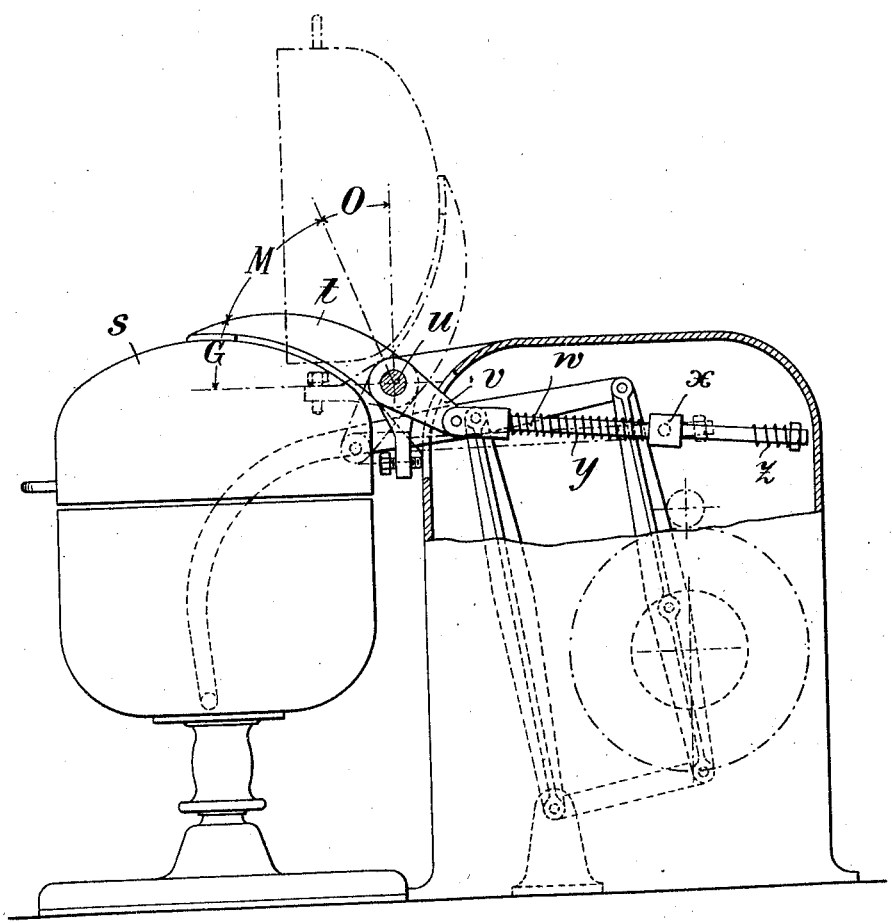

The gear shown in Fig. 4 is intended for straining-machines. Such machines are employed for forcing various kinds of fruit and other pasty materials and the like, soups, sauces and the like through a sieve.

As shown in the drawing the container $i$, having a square horizontal section is provided with a wall $i^1$ being curved to correspond to the travel curve of the driver $k$. This wall is perforated, and may be exchangeable, so as to allow of employing walls with perforations of different sizes. The driver consists of a cylindrical piece of wood $k$, rigidly fitted to the rod $l^1$. This driver is operated by the driving gear $m$, $n$, $o$ coupled to the upper end $l^2$ of rod $l^1$. The gear rocks on the pivot $p$ in the body of the machine. It is driven by means of the crank $r$ revolving on pivot $q$, and seizing with its pin $r^1$ approximately at the middle of rod $o$. When the crank revolves, the linked quadrilateral rocks in the manner shown in the drawing. The upper link $l^3$ of the driver rod describes the curve indicated by the dot-and-dash line, whereby the driver $k$ is moved in the container $i$ along the curve VI having the form of an egg with its point inclined upward.

During this travel the material between the driver $k$ and the wall $i^1$ is mashed and forced through the perforations.

The curve of the driver is of particular importance, because velocity of the driver decreases gradually from point 1 to point 3, thus at that part of the container where the driver has to perform the heaviest duty owing to the deposit of material formed there.

The driving gear is disposed in form of a linked quadrilateral, intentionally in order to utilize the weight of driver and rod gear for obtaining a better effect.

It may be further pointed out that the machine shown in Fig. 4 may also be used for mixing and kneading, in which case a container is used without perforations in its wall.

I claim:

1. In a device of the kind described in combination, a linked quadrilateral, one of the pivots of said quadrilateral being fixed, an arm fixed to and forming an elongation of one of the bars opposite said fixed pivot extending beyond the point adjoining said fixed pivot, a crank having its free end pivoted to the other opposite bar and means for turning said crank.

2. In a device of the kind described in combination, a linked quadrilateral, one of the pivots of said quadrilateral being fixed, an arm fixed to and forming an elongation of one of the bars opposite said fixed pivot extending beyond the point adjoining said fixed pivot, a crank having its free end pivoted to the other opposite bar, means for shifting the point of pivotal connection between said crank and said bar and means for turning said crank.

CARL LAURICK.

Witnesses:
 Dr. LORIAN BENVIU.
 HEINRICH VON RONEADOR.